United States Patent
Almehio et al.

(10) Patent No.: US 12,067,751 B2
(45) Date of Patent: Aug. 20, 2024

(54) METHOD FOR MANAGING IMAGE DATA, AND VEHICLE LIGHTING SYSTEM

(71) Applicant: VALEO VISION, Bobigny (FR)

(72) Inventors: Yasser Almehio, Bobigny (FR); Hafid El Idrissi, Bobigny (FR); Constantin Prat, Bobigny (FR)

(73) Assignee: Valeo Vision, Bobigny (FR)

( * ) Notice: Subject to any disclaimer, the term of this patent is extended or adjusted under 35 U.S.C. 154(b) by 115 days.

(21) Appl. No.: 17/919,699

(22) PCT Filed: Apr. 22, 2021

(86) PCT No.: PCT/EP2021/060610
§ 371 (c)(1),
(2) Date: Oct. 18, 2022

(87) PCT Pub. No.: WO2021/214264
PCT Pub. Date: Oct. 28, 2021

(65) Prior Publication Data
US 2023/0144346 A1   May 11, 2023

(30) Foreign Application Priority Data
Apr. 24, 2020 (FR) ...................................... 2004130

(51) Int. Cl.
*G06T 9/00* (2006.01)
*B60Q 1/14* (2006.01)
(Continued)

(52) U.S. Cl.
CPC ................ *G06T 9/00* (2013.01); *F21S 41/60* (2018.01); *B60Q 1/143* (2013.01); *F21S 41/141* (2018.01); *F21W 2102/13* (2018.01)

(58) Field of Classification Search
CPC ...... B60Q 2300/42; B60Q 1/08; B60Q 9/008; B60Q 1/1423; B60Q 2300/056;
(Continued)

(56) References Cited

U.S. PATENT DOCUMENTS 5,245,679 A    9/1993  Rosenberg
6,061,475 A *  5/2000  Blair ...................... G06T 9/004
                                                    382/239
(Continued)

FOREIGN PATENT DOCUMENTS

DE   102015012808 A1   4/2017
JP        H0690358 A   3/1994
JP       2019522594 A   8/2019

OTHER PUBLICATIONS

European Patent Office, International Search Report (with English translation) and Written Opinion of corresponding International Application No. PCT/EP2021/060610, dated Jul. 5, 2021.
(Continued)

*Primary Examiner* — Monica C King
(74) *Attorney, Agent, or Firm* — Valeo Vision

(57) ABSTRACT

The invention provides a method for managing image data in a motor vehicle lighting system, the lighting system including at least one lighting module intended to project light beams, the light beams being generated from data relating to the selection of at least one image, each image being respectively defined by a matrix including a plurality of horizontal or vertical rows of pixels, with each pixel having a numerical value related to a light intensity of the pixel. The method includes determining whether the pixel under analysis is considered to be a significant point of inflection of the image, so as to transmit it to at least one lighting module, so that it is able to project a resulting image.

12 Claims, 9 Drawing Sheets

(51) Int. Cl.
*F21S 41/141* (2018.01)
*F21S 41/60* (2018.01)
*F21W 102/13* (2018.01)

(58) Field of Classification Search
CPC ........ B60Q 2300/112; B60Q 2300/122; B60Q 2300/126; B60Q 2300/322; B60Q 2300/41; G06V 10/147; G06V 20/584; G06V 20/588; G06V 20/58; G06V 20/582; B60R 1/001; B60R 1/04; B60R 1/12; B60R 1/24; B60R 1/26; B60R 11/04; B60R 2001/1215; B60R 2001/1253; B60R 2011/0026; B60R 2300/205; B60R 2300/207; B60R 2300/30; B60R 2300/301; B60R 2300/302; B60R 2300/804; B60R 2300/8093; G06T 7/20; G06T 1/0014; G06T 2207/10012; G06T 2207/10152; G06T 2207/20056; G06T 2207/30121; G06T 7/0004; G06T 7/0006; G06T 7/514; G06T 7/521; G06T 7/586
See application file for complete search history.

(56) References Cited

U.S. PATENT DOCUMENTS

| | | | |
|---|---|---|---|
| 9,609,289 B2* | 3/2017 | Schofield | B60R 1/26 |
| 10,071,676 B2* | 9/2018 | Schofield | H04N 25/76 |
| 10,391,927 B2 | 8/2019 | Lahmer | |
| 2005/0052465 A1* | 3/2005 | Moore | G06F 3/023 |
| | | | 345/603 |
| 2020/0084854 A1* | 3/2020 | Bonne | H05B 45/10 |

OTHER PUBLICATIONS

Sklansky J. et al: "Fast Polygonal Approximation of Digitized Curves", Pattern Recognition and Image Processing, vol. 12, No. 5, (Jan. 1, 1980). pp. 327-331, Pergamon Press Ltd., © Pattern Recognition Society, GB.

Ehrman L.: "Analysis of Som eRedundancy Removal Bandwidth Compression Techniques", Proceedings of the IEEE, IEEE, vol. 3, No. 55 (Mar. 1, 1967) pp. 278-287, New York, US.

Gardenhire L.W.: "Redundancy Reduction the Key to Adaptive Telemetry", Proceedings National Telemetry Conference, XX, XX, (Jan. 1, 1964) pp. 1-16, Radiation Inc., Melbourne, FL.

Japan Patent Office, Office Action (including English translation) of corresponding Japanese Patent Application No. 2022-564390, dated Oct. 27, 2023.

* cited by examiner 110 100

125 120

124

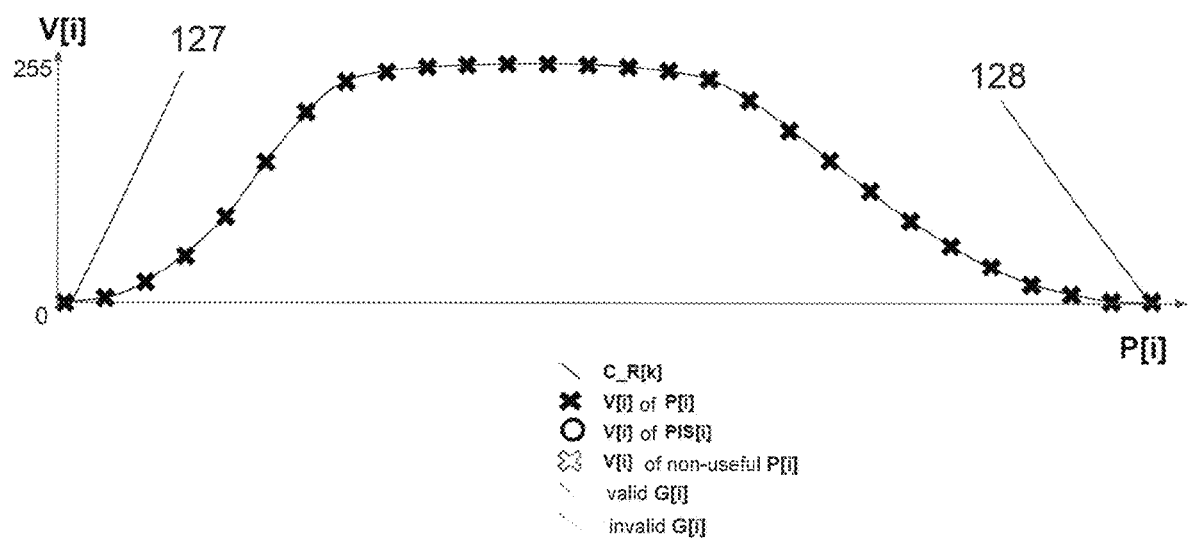

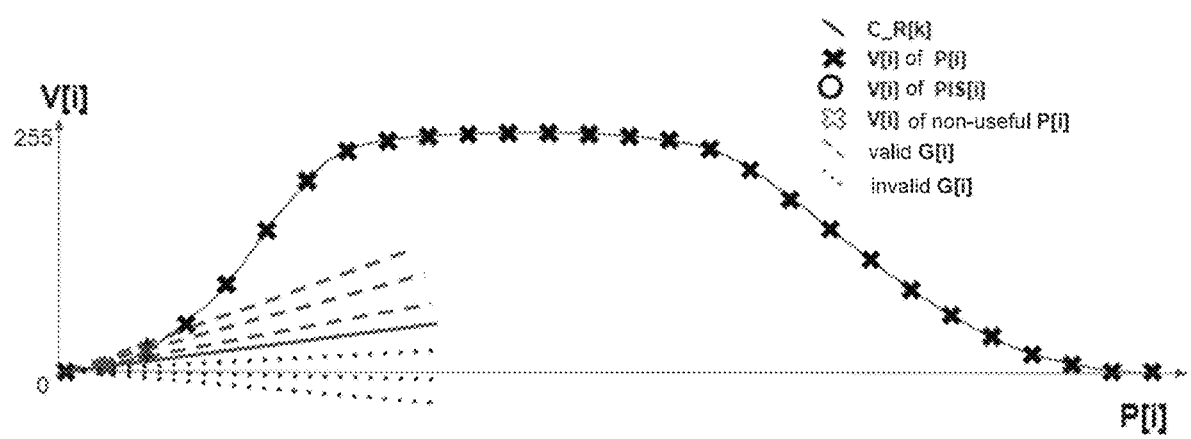

Fig 7

| Photométrie/Photometry | | | | Fonctions / Features | | | | | Compression (E_max, G_Err => constant) | | | | Compression (E_Max, G_Err => variable) | | | |
|---|---|---|---|---|---|---|---|---|---|---|---|---|---|---|---|---|
| LB | HB | OFF | DBL | ADB | TSAG | RW | LA | LA Center | E_Max | G_Err | Mbit/s | % | E_Max | G_Err | Mbit/s | % |
| x | | | | | | | | | 3 | 16/255 | 1917 | 92.51 | 3 | 16/255 | 1917 | 92.51 |
| x | | | | | | x | | | 3 | 16/255 | 2913 | 88.62 | 3 | 32/255 | 2797 | 89.07 |
| x | | | | | | | x | | 3 | 16/255 | 2925 | 88.57 | 3 | 32/255 | 2775 | 89.16 |
| x | | | | | | | | x | 3 | 16/255 | 2373 | 90.73 | 3 | 32/255 | 2317 | 90.95 |
| x | | | x | | | | | | 3 | 16/255 | 1741 | 93.20 | 3 | 16/255 | 1731 | 93.20 |
| | x | | | | | | | | 3 | 16/255 | 3313 | 87.06 | 4 | 16/255 | 2649 | 89.65 |
| | x | | | | | x | | | 3 | 16/255 | 3975 | 84.47 | 5 | 32/255 | 2725 | 89.36 |
| | x | | | | | | x | | 3 | 16/255 | 4019 | 84.30 | 5 | 32/255 | 2749 | 89.26 |
| | x | | | | | | | x | 3 | 16/255 | 3561 | 86.09 | 5 | 32/255 | 2365 | 90.76 |
| | x | | | x | | | | | 3 | 16/255 | 3981 | 84.45 | 5 | 32/255 | 2781 | 89.14 |
| | x | | | x | | x | | | 3 | 16/255 | 4635 | 81.89 | 6 | 64/255 | 2801 | 89.06 |
| | x | | | x | | | x | | 3 | 16/255 | 4679 | 81.72 | 6 | 96/255 | 2741 | 89.29 |
| | x | | | x | | | | x | 3 | 16/255 | 4231 | 83.47 | 5 | 64/255 | 2779 | 89.14 |
| | x | | | | x | | | | 3 | 16/255 | 3535 | 86.19 | 5 | 32/255 | 2403 | 90.61 |
| | x | | | | x | x | | | 3 | 16/255 | 4197 | 83.61 | 6 | 64/255 | 2507 | 90.21 |
| | x | | | | x | | x | | 3 | 16/255 | 4241 | 83.43 | 6 | 64/255 | 2569 | 89.96 |
| | x | | | | x | | | x | 3 | 16/255 | 3783 | 85.22 | 5 | 64/255 | 2523 | 90.14 |
| | x | | | x | x | | | | 3 | 16/255 | 4237 | 83.45 | 5 | 64/255 | 2805 | 89.04 |
| | x | | | x | x | x | | | 3 | 16/255 | 4891 | 80.89 | 7 | 96/255 | 2725 | 89.36 |
| | x | | | x | x | | x | | 3 | 16/255 | 4935 | 80.72 | 7 | 96/255 | 2767 | 89.19 |
| | x | | | x | x | | | x | 3 | 16/255 | 4487 | 82.47 | 6 | 64/255 | 2743 | 89.29 |
| | x | | x | | | | | | 3 | 16/255 | 2541 | 90.07 | 4 | 16/255 | 2055 | 91.91 |
| | x | | x | x | | | | | 3 | 16/255 | 3693 | 85.57 | 5 | 64/255 | 2683 | 89.45 |
| | x | | x | x | | x | | | 3 | 16/255 | 4411 | 82.77 | 7 | 96/255 | 2687 | 89.39 |
| | x | | x | x | | | x | | 3 | 16/255 | 4477 | 82.51 | 7 | 96/255 | 2705 | 89.40 |
| | x | | x | x | | | | x | 3 | 16/255 | 4127 | 83.88 | 6 | 64/255 | 2757 | 89.19 |
| | | x | | | | x | | | 3 | 16/255 | 1349 | 94.73 | 3 | 16/255 | 1349 | 94.73 |
| | | x | | | | | x | | 3 | 16/255 | 1683 | 93.43 | 3 | 16/255 | 1683 | 93.43 |
| | | x | | | | | | x | 3 | 16/255 | 1051 | 95.89 | 3 | 16/255 | 1051 | 95.89 |
| | | x | | | | | | | 3 | 16/255 | 203 | 99.21 | 3 | 16/255 | 203 | 99.21 |

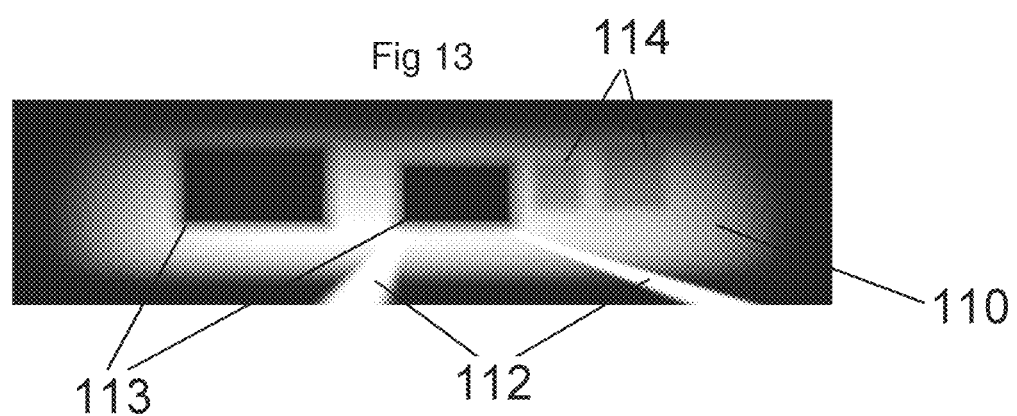
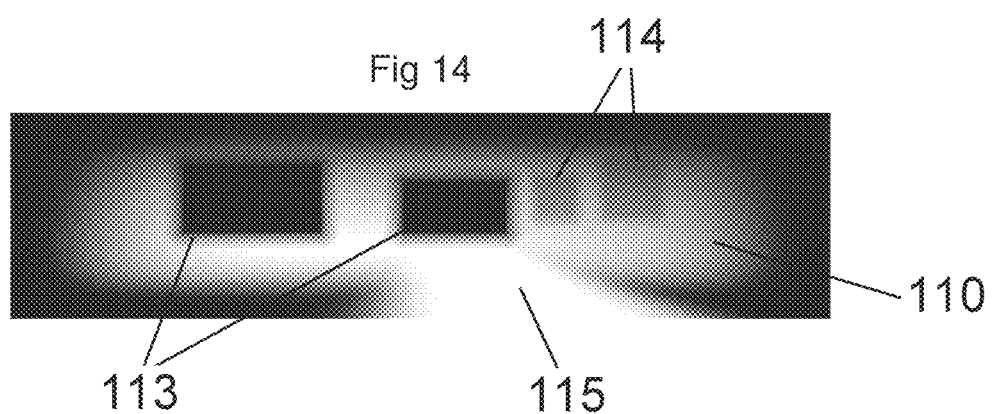
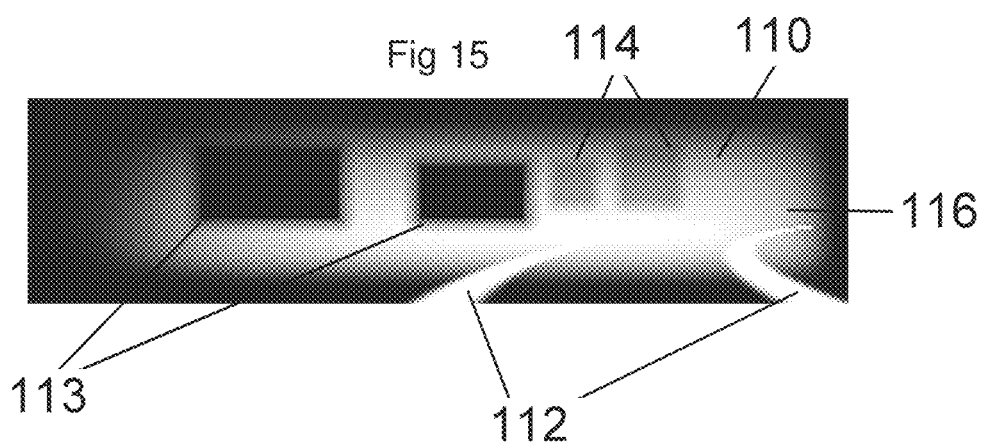

METHOD FOR MANAGING IMAGE DATA, AND VEHICLE LIGHTING SYSTEM

CROSS-REFERENCE TO RELATED APPLICATIONS

This application is filed under 35 U.S.C. § 371 U.S. National Phase of International Application No. PCT/EP2021/060610 filed Apr. 22, 2021 (published as WO2021214264), which claims priority benefit to French Application No. 2004130 filed on Apr. 24, 2020, the disclosures of which are herein incorporated by reference in their entirety.

TECHNICAL FIELD

This invention relates to the field of vehicle lighting systems, and more particularly to managing image data for controlling light sources of a vehicle

BACKGROUND OF THE INVENTION

Modern lighting systems comprise in particular light sources that now make it possible to project a high-definition light beam. The desired projection of high-definition light may be obtained via the light sources and from images, or image patterns, that the sources receive in order to display them and thus project a given light beam. These images or image patterns are able to achieve very high resolutions now, in particular depending on the resolution of the light source that is used. By way of example, the light source may have at least 4 000 to 30 000 pixels, thus making it possible to generate a light beam from an image with this level of resolution.

To succeed in generating such high-definition light beams, multiple light sources may be used, or even combined, which requires controlling them and finely synchronizing these sources in order to provide well-controlled, varied and adaptive lighting functionalities.

Vehicles therefore carry increasingly greater numbers of light sources, which use increasingly heavy high-definition image data, this involving a large amount of data that have to be managed by a vehicle control unit and communicated via a transmission means between the control unit and the one or more light sources. To do this, for example, a CAN protocol data bus is often used to transfer such data between the control unit and the light source. However, these data transmission means have the drawback of having a limited bandwidth, not allowing for example a bit rate of 2 to 5 Mbps to be exceeded in general. As a result, difficulties arise in transmitting the large amount of data required for said high-definition images over these limited networks. In addition, these networks are also used for the communication of other vehicle data, which means that the bandwidth available for high-definition image data may be even lower, for example limited to a range of 70 to 90% of the maximum bit rate possible over the data transmission network.

BRIEF SUMMARY OF THE INVENTION

By way of example, to communicate high-definition image data for the projection of a lighting function with a resolution of 20 000 pixels, the bit rate required over a CAN-FD transmission network would generally be 10 to 12 Mbps. However, such a CAN-FD network is currently actually limited to 5 Mbps (or even 2 Mbps in most cases). There is therefore a need to optimize the data transmitted over these networks, and in particular to compress the data that are communicated in order to transmit a stream of high-definition image data that is sufficient to ensure the one or more associated lighting functions, while observing the bit rate and bandwidth constraints of this same network.

Known compression methods have been contemplated to overcome this problem, but they have all proven to be inadequate with respect to high-beam specificity, thereby hindering a sufficient reduction in the bandwidth as required by motor vehicle manufacturers.

To achieve this, provision could be made for multiple levels or iterations of data compression to be carried out, until succeeding in meeting a desired bandwidth. Still, such an approach has a very significant impact on the display quality of the projected lighting functions, since with each compression performed, display quality is affected; it is reduced.

However, for certain lighting functions, for example adaptive driving beams (ADBs) and road writing (RW), display quality cannot be overly degraded, as otherwise the user experience will be significantly lessened, with the light information projected by the light beam being made unclear, inadequate or even illegible.

There is therefore a need for a technical solution in order to overcome the abovementioned drawbacks.

The invention provides an at least partial solution to the technical problems highlighted above by way of a method for managing image data in a motor vehicle lighting system, said lighting system comprising at least one lighting module intended to project light beams, said light beams being generated from data relating to the selection of at least one image, each image being respectively defined by a matrix comprising a plurality of horizontal or vertical rows of pixels, wherein each pixel is characterized by a numerical value related to a light intensity of said pixel, said method comprising the following steps:

receiving an instruction to activate at least one image intended to be projected;

from the first row to the last row of the matrix, sequentially carrying out the following steps, from the first pixel to the last pixel of the row:

calculating a gradient value based on the numerical value of the pixel under analysis and on the numerical value of the adjacent pixel;

determining whether the pixel under analysis is a significant point of inflection of a curve relating to the row, based on E_Max the difference in intensity between the original pixel and the compressed pixel, and based on G_Err the spatial difference between the original pixel and the compressed pixel;

dynamically adapting the value E_Max relating to the difference in intensity between the original pixel and the compressed pixel, along with the value G_Err relating to the spatial difference between the original pixel and the compressed pixel based on the activation of at least one photometry and/or lighting function;

if the pixel under analysis is considered to be a significant point of inflection, then the pixel is saved as a compressed pixel in a list to be transmitted, otherwise the pixel under analysis is not saved;

the previous steps are reiterated until the last pixel of the last row of the matrix; and in that the list of compressed pixels of the matrix is transmitted to at least one lighting module so that it is able to project a resulting image.

In one embodiment, the values E_Max and G_Err are respectively constant, configured so as to achieve a desired compression rate, with respect to the activation of at least one photometry and/or lighting function.

In this embodiment, the value E_Max is set to 3 and/or the value G_Err is set to 16/255.

In another embodiment, when a photometry relating to a low beam LB is activated,
then the value of E_Max is set to 3, and:
in the absence of activated ADB, TSAG, RW, LA, LA_Center lighting functions,
then the value of G_Err is set to 16/255, or
if one of the RW, LA, LA_Center lighting functions is activated, then the value of G_Err is set to 32/255, or
if a DBL photometry is activated, then the value of G_Err is set to 16/255.

In another embodiment, when a photometry relating to the high beams HB is activated:
in the absence of activated ADB, TSAG, RW, LA, LA_Center lighting functions, or when DBL photometry is activated, then the value E_Max is set to 4 and the value G_Err is set to 16/255;
when the ADB, or TSAG, or RW, or LA, or LA_Center lighting functions are activated, then the value E_Max is set to 5 and the value G_Err is set to 32/255;
when the following lighting functions are activated:
ADB combined with LA_Center, or
TSAG combined with LA_Center, or
ADB combined with TSAG with or without DBL, then the value E_Max is set to 5 and the value G_Err is set to 64/255;
when the following lighting functions are activated:
ADB on its own or combined with TSAG and LA_Center;
TSAG combined with RW or LA; then the value E_Max is set to 6 and the value G_Err is set to 64/255;
when the lighting functions ADB combined with LA are activated, then the value E_Max is set to 6 and the value G_Err is set to 96/255;
when the lighting functions ADB and TSAG combined with RW or LA are activated, then the value E_Max is set to 7 and the value G_Err is set to 96/255 for a photometry with or without DBL.

In another embodiment, when an OFF photometry is activated, in other words when the numerical value of all of the pixels of the original image is at 0 or off, and when the lighting functions RW, or LA, or LA_Center are activated, then the value E_Max is set to 3 and the value G_Err is set to 16/255.

In another embodiment, depending on the photometries and/or lighting function that are activated and the values set respectively for E_Max and G_Err, the compression rate is greater than 85%.

In a second inventive concept of the invention, the invention relates to a motor vehicle lighting system comprising:
at least one lighting module comprising a plurality of light sources able to project at least one photometry and/or lighting function from compressed data,
a multiplexed bus for transmitting compressed data to at least one lighting module,
a control unit configured so as to implement all of the steps of the method according to any one of the preceding features.

According to one embodiment, the lighting module furthermore comprises a control unit configured so as to be able to decompress the list of compressed pixels.

According to another embodiment, the control unit of each lighting module comprises a memory that stores at least one Welcome and/or one Goodbye scenario.

According to another advantageous embodiment, at least one lighting module comprises at least one semiconductor light source, such as LEDs, and in particular a pixelated LED source.

In comparison with incandescent lighting, semiconductor lighting generates visible light with lower heat production and less energy dissipation. The generally low weight of a semiconductor electronic lighting device affords greater resistance to impacts and vibrations than brittle glass tubes/bulbs and long, thin filament wires. They are also not subject to filament evaporation, which may increase the service life of the lighting device. Some examples of these types of lighting comprise semiconductor light-emitting diodes (LEDs), organic light-emitting diodes (OLEDs), or polymer light-emitting diodes (PLEDs) as light sources instead of electrical filaments, plasma or gas.

Unless otherwise defined, all terms (including technical and scientific terms) used in this document should be interpreted in accordance with the standard practices of the profession. It is also understood that terms in common use are to be interpreted as customary in the relevant art and not in an idealized or overly formal sense, unless expressly defined as such herein.

BRIEF DESCRIPTION OF THE DRAWINGS

To supplement the description and to allow better understanding of the invention, a set of figures is provided. These figures form integral parts of the description and illustrate one embodiment of the invention, which should not be interpreted as limiting the scope of the invention, but merely as an example of how the invention may be carried out. The figures are as follows:

FIG. 3 illustrates a curve representing one of the rows of the image according to FIG. 1, according to one embodiment of the invention;

FIGS. 4a and 4b illustrate schematic depictions relating to the steps of determining significant points of inflection of the curve according to FIG. 3, according to the method according to the invention;

FIG. 7 illustrates a table summarizing the compression rates of the photometries and/or lighting functions with respect to the configuration of the parameters E_max and G_Err, according to the invention;

FIG. 13 illustrates a schematic depiction of a photometry relating to an HB with the TSAG, ADB and LA lighting functions activated;

FIG. 14 illustrates a schematic depiction of a photometry relating to an HB with the TSAG, ADB and LA_Center lighting functions activated;

FIG. 15 illustrates a schematic depiction of a photometry relating to HB and DBL, with the TSAG, ADB and LA lighting functions activated.

DETAILED DESCRIPTION OF THE INVENTION

Figure 1:
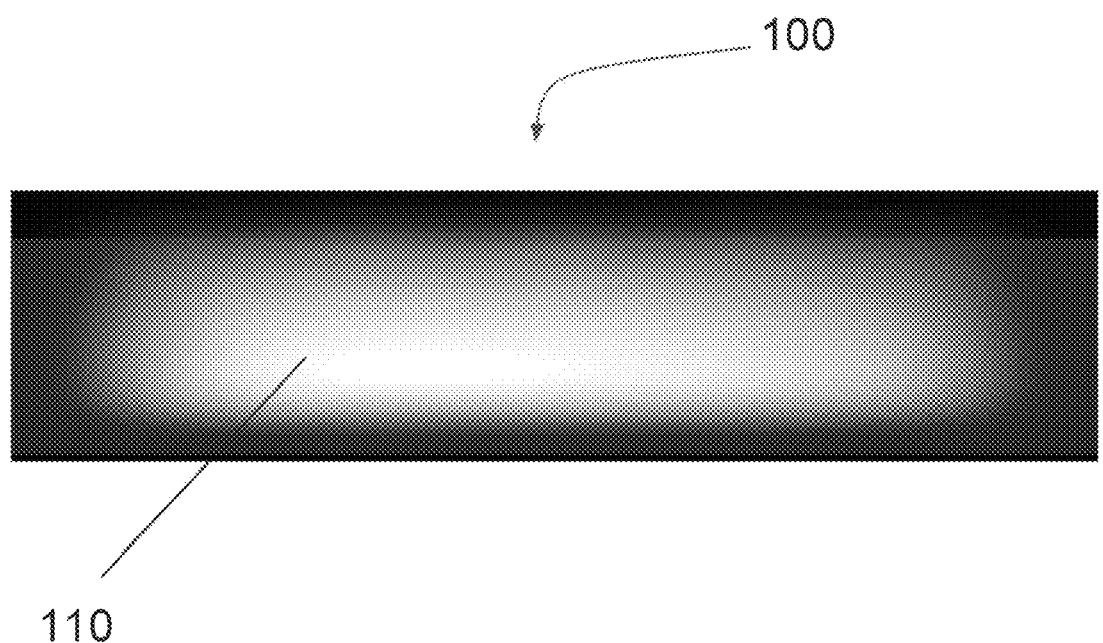
FIG. 1 illustrates a schematic depiction of an image relating to a high-beam photometry, according to one embodiment of the invention.

In the remainder of the description, a set of abbreviations, references and/or numbers have been used, their definitions have been listed below for a better understanding of the figures, but certain references are not illustrated in order to lighten the figures, but are known to those skilled in the art:

SYS 200: Motor vehicle lighting system comprising at least one lighting module HL[z], a multiplexed bus CAN 240, and a control unit PCM 230;

HL[z] 220: lighting module, essential component for the projection of light beams of the same resolution, z corresponding to the number of the module;

I[x] 100: original image relating to a set of non-exhaustive photometries or lighting functions of the type LB 111, HB 110, OFF, DBL 116, ADB 113, TSAG 114, RW, LA 112, LA_Center 115.

M[x] 120: corresponding to the matrix equivalent of the image I[x] 100.

LB 111: (low beam) photometry representative of a low beam;

HB 110: (high beam) photometry representative of a high beam;

OFF: photometry where the numerical value V[i] of all of the pixels P[i] 125 of the image I[x] 100 are at 0 or off;

DBL 116: (dynamic bending light) photometry that allows dynamic directional lighting, in other words a horizontal displacement of the maximum intensity of an LB 111 or HB 110 photometry depending on the angle of rotation of the steering wheel of a motor vehicle;

ADB 113: (adaptive driving beam) function that allows lighting with a high-beam photometry while avoiding dazzling other road users;

TSAG 114: (traffic sign anti-glare) lighting function that makes it possible to avoid dazzling the traffic signs on a road following the projection of light beams from the motor vehicle;

RW: (road writing) lighting function that allows the projection, onto the road, of patterns visible to the driver and/or to road users;

LA: (line assist) lighting function that allows the projection of line-type patterns onto the road, in particular to delimit a portion of road to be taken by the motor vehicle or to present an obstacle avoidance strategy;

LA_Center 115: is a variant of LA 112, except that it is projected at the center of the road, in particular to indicate a direction of the vehicle.

P[i] 125: Pixel of the image 100, where i is a variable ranging from an initial value 1 to a final value F;

V[i]: Numerical value of the pixel P[i] 125, where i is a variable ranging from an initial value 1 to a final value F;

G[i]: Value of the gradient of P[i] 125

R[k] 124: k-th rows of the image I[x] 100 or of the matrix M[x] 120, where k is a variable ranging from an initial value 1 to a final value D;

C_R[k]: Curve relating to the k-th row R[k] 124;

PIS[i]: Significant point of inflection of a curve C_R[k], the point where a change in concavity of the curve C_R[k] takes place, the PIS[i] is considered to be a pixel intended to be compressed, where i is a variable ranging from an initial value 1 to a final value F;

E_Max: (error max) Difference in intensity between the original pixel P[i] 125 and the compressed pixel PIS[i];

E_Max_V[i]: (current error max) Maximum tolerated difference between the value V[i] of the pixel P[i] 125 of the original image I[x] and the value of the compressed pixel PIS[i];

G_Err: (gradient error) Spatial difference between the original pixel P[i] 125 and the compressed pixel PIS[i];

PCM 230: (pixel controller module), a control unit intended to drive a set of pixels of lighting modules via a control unit UC[z] 210;

UC[z] 210: Control unit, also called driver, intended to control a lighting module. Each control unit UC[z] 210 interacts as a "slave" with respect to the control unit PCM 230, which is considered to be a "master".

The exemplary embodiments are described in sufficient detail to allow those of ordinary skill in this art to be able to implement the systems and processes described below. It is important to understand that the embodiments may be provided in a number of alternative forms and should not be construed as being limited to the examples presented below.

Consequently, although an embodiment may be modified in various ways and take various alternative forms, specific embodiments thereof are shown in the drawings and described in detail below by way of example. No limitation to the particular forms disclosed is intended. Rather, all modifications, equivalents and alternatives falling within the scope of the appended claims are to be included.

FIG. 1 illustrates a schematic depiction of an image I[x] 100, referred to as original image, relating to an HB 110 (high beam) photometry of a motor vehicle lighting device HL.

According to the invention, each image I[x] 100 has its equivalent in the form of a matrix M[x] 120 of pixels P[i] 125, each pixel P[i] 125 being characterized by a numerical value V[i] linked to a light intensity on a scale ranging from 0, corresponding to black, up to 255, corresponding to white.

Figure 2:
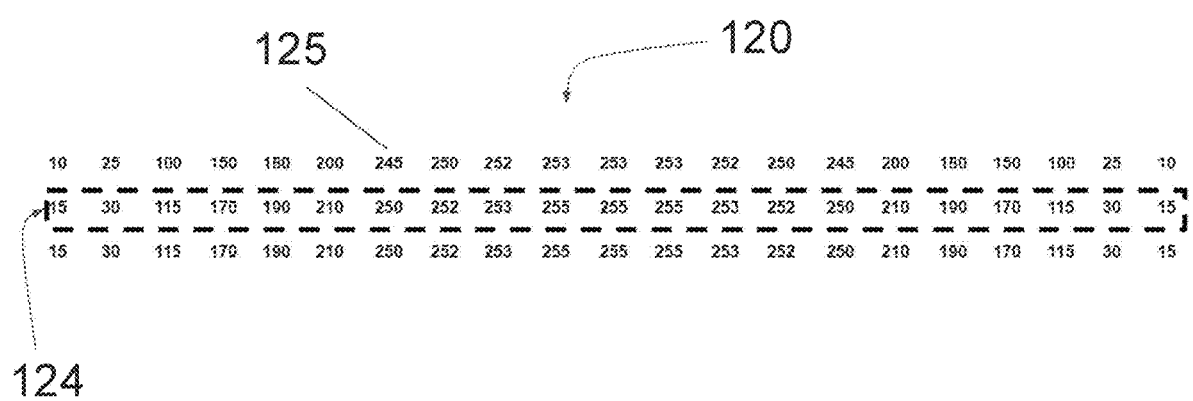
FIG. 2 illustrates a partial matrix of pixels of the photometry according to FIG. 1, according to one embodiment of the invention.

FIG. 2 illustrates one embodiment relating to a partial matrix M[x] 120 of pixels P[i] 125 with a photometry corresponding to the high beams HB 110 according to FIG. 1.

Nowadays, a modern motor vehicle has a control unit, commonly called PCM 230 (for pixel controller module), intended to drive a set of pixels of lighting modules HL[z] 220 via a control unit UC[z] 210, where the variable z ranging from 1 to n corresponds to the number assigned to the lighting module HL[z] 220. The control unit PCM 230 and each control unit UC[z] 210 comprises, respectively and in a non-exhaustive manner, at least one microprocessor and a memory (not referenced) configured so as to allow the implementation of a method for driving the projection of light beams from a motor vehicle lighting device HL according to the invention.

The control unit PCM 230 is configured such that, depending on data collected from a set of sensors distributed in the motor vehicle and on the environmental context in which said vehicle is moving, said control unit PCM 230 is capable of deciding, in complete autonomy or under the impulse of a driver, or on the behavior of said driver on the road, to activate or deactivate at least one regulatory photometry and/or lighting function. In the context of this invention, the two concepts of photometry and lighting function are distinct. Indeed, it will be considered, in a non-exhaustive list, that the term photometry encompasses an image I[x] 100, with x ranging from 1 to 4, where:

I[1] comprises an equivalent matrix M[1] corresponding to a high beam HB 110;

I[2] comprises an equivalent matrix M[2] corresponding to a low beam LB 111;

I[3] comprises an equivalent matrix M[3] where all of the pixels have a numerical value V[i] of 0, in other words all of the pixels P[i] 125 are off, with i ranging from 1 to F;

I[4] comprises an equivalent matrix M[4] corresponding to a dynamic bending light DBL 116.

Likewise, it will be considered, in a non-exhaustive list, that the term lighting function encompasses an image I[x] 100, with x ranging from 5 to 9, where:

I[5] comprises an equivalent matrix M[5] corresponding to an ADB 113 (adaptive driving beam) function that allows lighting with an LB 111, HB 110 or DBL 116 photometry while avoiding dazzling other road users;

I[6] comprises an equivalent matrix M[6] corresponding to a TSAG 114 (traffic sign anti-glare) function that makes it possible to avoid dazzling the traffic signs on a road following the projection of light beams from the motor vehicle;

I[7] comprises an equivalent matrix M[7] corresponding to an RW (road writing) function that allows the projection, onto the road, of patterns visible to the driver and/or to road users;

I[8] comprises an equivalent matrix M[8] corresponding to an LA (line assist) function that allows the projection of line-type patterns onto the road with or without a sensation of the lines scrolling, so as to delimit a portion of road to be taken by the motor vehicle or to project an obstacle avoidance strategy;

I[9] comprises an equivalent matrix M[9] corresponding to an LA_Center 115 function, which is a variant of the LA function, except that it is projected at the center of the road, in particular to indicate a direction of the vehicle.

The invention is in no way limited to just the photometries and lighting functions mentioned above, and it goes without saying that images relating to a welcome/goodbye scenario, or other photometries/lighting functions specific to the regulations of a country or region of the world could be added or updated.

According to the invention, a database comprising a set of matrices M[x] 120 of photometries and lighting functions possible on a road, in particular depending on the respective regulations, is recorded in the memory of the control unit PCM 230.

The control unit PCM 230, following the reception of an instruction from the driver or on its own initiative with regard to the environmental context of the motor vehicle, activates the projection of an image I[x] 100, and the corresponding matrix M[x] 120 is then selected from the database saved in the memory of the control unit PCM 230.

Figure 4B:
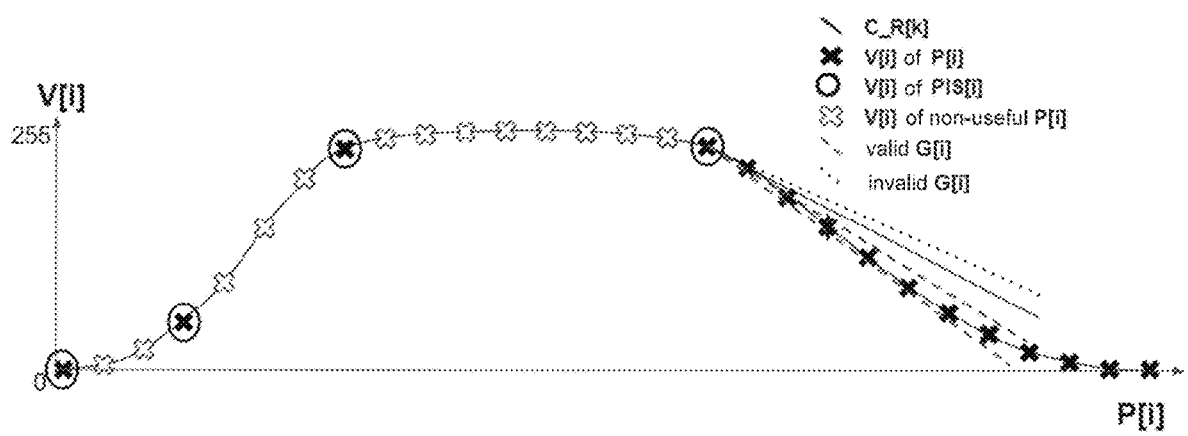

In a first embodiment of the invention, illustrated in particular in FIG. 4a and FIG. 4b, for each row R[k] 124 of the matrix M[x] 120 according to FIG. 2, with k ranging from the first row k=1 to the last row k=D, this gives a curve C_R[k] according to FIG. 3.

The control unit PCM 230 then sequentially carries out the following steps for each of the curves C_R[k], from the first pixel P[1] 127 to the last pixel P[F] 128 of the row R[k] 124:

calculating a gradient value G[i] based on the numerical value V[i] of the pixel P[i] 125 under analysis and on the numerical value V[i+1] of the adjacent pixel PIS[i+1]. Such calculation of the gradient G[i] is performed as follows: G[i]=V[i+1]−V[i], with i ranging from 1 to F;

determining whether the pixel P[i] 125 under analysis is a significant point of inflection PIS[i] of the curve C_R[k] relating to the row R[k] 124;

To obtain the significant point of inflection PIS[i], the control unit PCM 230:

determines a value E_Max_V[i] corresponding to the maximum tolerated difference between the value V[i] of the pixel P[i] 125 under analysis of the original image I[x] 100 and the value V[i] of the compressed pixel PIS[i]. Such calculation of E_Max_V[i] is performed as follows E_Max_V[i]=E_Max+G[i]*G_Err, where E_Max and G_Err are parameters that may be constant or variable depending on the desired compression strategy. E_max corresponds to the difference in intensity between the original pixel P[i] 125 and the compressed pixel PIS[x] and G_Err corresponds to the spatial difference between the original pixel P[i] 125 and the compressed pixel PIS[x];

determines the list of vectors or gradients G[i] close to the pixel P[i] 125 under analysis. This list of vectors or gradients G[i] is between the value G[i]−E_Max_V[i] and the value G[i]+E_Max_V[i];

as long as the list of vectors or gradients G[i] is greater than 0, then, for each vector or gradient G[i] of the list, if the following condition IV [i−a]+G[i−a]*(P[i−a]−P[i])−V[i]|>E_Max_V[i] is met, then all vectors or gradients G[i] will be considered to be invalid and removed from the list of gradients, otherwise it will be considered to be valid; this step is reiterated for as long as the list of gradients G[i] is greater than 0, otherwise the pixel P[i] 125 will be considered to be a pixel to be compressed and will be saved in the list LPIS[i] of compressed pixels PIS[i] to be transmitted. It should be noted that the value of "a" ranges from 1 to M, and corresponds to the number of pixels for which the condition is true. As soon as the condition becomes false, then the value of "a" is reset to 1 in order to move on to the analysis of the adjacent pixel P[i+1].

FIG. 7 illustrates a table summarizing the compression rates of the photometries and/or lighting functions with respect to the configuration of the parameters E_max and G_Err, according to one embodiment of the invention. These values result from experimental data. According to the invention, it appears that, when the values E_Max and G_Err are respectively constant, a desired compression rate is achieved, depending on the activation of at least one photometry and/or lighting function.

Thus, in one embodiment, when the value E_Max is set to 3 and/or when the value G_Err is set to 16/255, the compression rate fluctuates relatively with an average value close to 85% with a margin of +/−5% with respect to the photometry and/or functions that are activated.

In another embodiment, when a photometry relating to a low beam LB 111 is activated, then the value of E_Max is set to 3, and:

in the absence of activated lighting functions such as ADB 113, TSAG 114, RW, LA 112, LA_Center 115, then the value of G_Err is set to 16/255, or if one of the RW, LA 112, LA_Center 115 lighting functions is activated, then the value of G_Err is set to 32/255, or if a DBL 116 photometry is activated, then the value of G_Err is set to 16/255.

In another embodiment, when a photometry relating to the high beams HB 110 is activated:

in the absence of activated ADB 113, TSAG 114, RW, LA 112, LA_Center 115 lighting functions, or when DBL 116 photometry is activated, then the value E_Max is set to 4 and the value G_Err is set to 16/255;

when the ADB 113, or TSAG 114, or RW, or LA 112, or LA_Center 115 lighting functions are activated, then the value E_Max is set to 5 and the value G_Err is set to 32/255;

when the following lighting functions are activated:
ADB 113 combined with LA_Center 115, or
TSAG 114 combined with LA_Center 115, or
ADB 113 combined with TSAG 114 with or without DBL 116, then the value E_Max is set to 5 and the value G_Err is set to 64/255;

when the following lighting functions are activated:
ADB 113 on its own or combined with TSAG 114 and LA_Center 115;
TSAG 114 combined with RW or LA 112;

then the value E_Max is set to 6 and the value G_Err is set to 64/255;

when the lighting functions ADB 113 combined with LA 112 are activated, then the value E_Max is set to 6 and the value G_Err is set to 96/255;

when the lighting functions ADB 113 and TSAG 114 combined with RW or LA 112 are activated, then the value E_Max is set to 7 and the value G_Err is set to 96/255 for a photometry with or without DBL 116.

In another embodiment, when an OFF photometry is activated, in other words when the numerical value V[i] of all of the pixels P[i] 125 of the original image I[x] 100 is at 0 or off, and when the lighting functions RW, or LA 112, or LA_Center 115 are activated, then the value E_Max is set to 3 and the value G_Err is set to 16/255.

Figure 6:
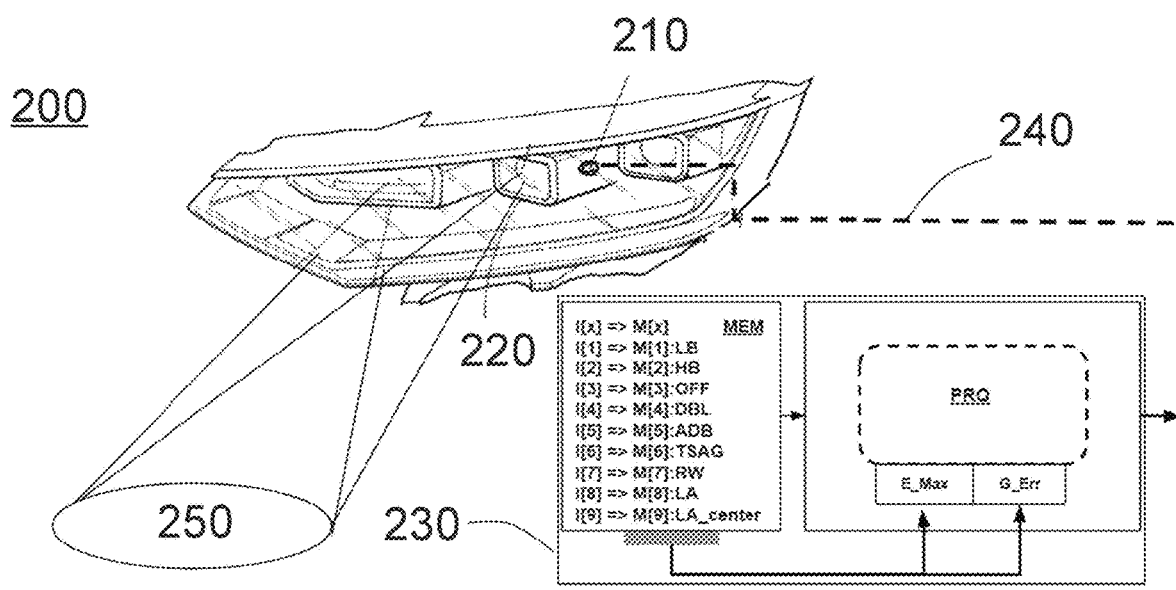
FIG. 6 illustrates a motor vehicle lighting system according to the invention.

FIG. 6 shows a motor vehicle lighting system SYS 200 according to the invention, comprising:

at least one lighting module HL[z] 220 comprising a plurality of light sources, such as LEDs, capable of projecting photometries and/or lighting functions from compressed data LPIS[i];

a multiplexed CAN 240, CAN-FD bus or the like, for transmitting compressed data LPIS[i] to at least one lighting module HL[z] 220;

a control unit PCM 230 intended to implement all of the abovementioned compression steps, so as to generate compressed data PIS[i];

a control unit UC[z] 210 configured to decompress the compressed data, this control unit UC[z] 210 being located in the lighting module HL[z] 220.

Figure 5:
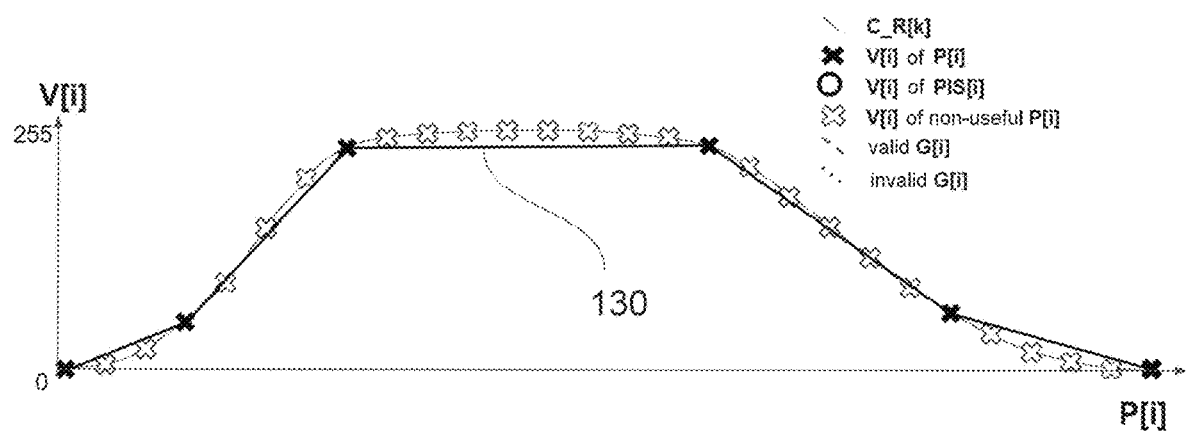
FIG. 5 illustrates the result of a decompression step, according to one embodiment of
the invention.

Such a step of decompressing the list LPIS[i] of compressed pixels PIS[i] received via the CAN 240 at the lighting modules HL[z] 220 is performed by way of:

a linear interpolation of the sub-intervals between the significant points of inflection of the curve C_PIS[i] 130 formed by the list of compressed pixels, as seen in FIG. 5, or a polynomial interpolation of the sub-intervals between the significant points of inflection of the curve C_PIS[i] formed by the list of compressed pixels, or an interpolation, using the Bézier curve method, of the sub-intervals between the significant points of inflection of the curve C_PIS[i] formed by the list of compressed pixels, or an interpolation, using the parametric adaptation method, of the sub-intervals between the significant points of inflection of the curve C_PIS[i] formed by the list of compressed pixels, or an interpolation, using the least squares method, of the sub-intervals between the significant points of inflection of the curve C_PIS[i] formed by the list of compressed pixels, or an interpolation, using the exponential modeling method, of the sub-intervals between the significant points of inflection of the curve C_PIS[i] formed by the list of compressed pixels, or an interpolation, using the Fourier series method, of the sub-intervals between the significant points of inflection of the curve C_PIS[i] formed by the list of compressed pixels, or an interpolation, using the Gaussian modeling method, of the sub-intervals between the significant points of inflection of the curve C_PIS[i] formed by the list of compressed pixels, or an interpolation, using the power series method, of the sub-intervals between the significant points of inflection of the curve C_PIS[i] formed by the list of compressed pixels, or an interpolation, using the sums of sines models method, of the sub-intervals between the significant points of inflection of the curve C_PIS[i] formed by the list of compressed pixels, or an interpolation, using the Weibull distribution method, of the sub-intervals between the significant points of inflection of the curve C_PIS[i] formed by the list of compressed pixels, an interpolation, using the personalized models method, of the sub-intervals between the significant points of inflection of the curve C_PIS[i] formed by the list of compressed pixels.

Each lighting module HL[z] 220 makes it possible to obtain a projection of high beams or a resulting image Ir[x] 250 of a quality substantially identical to the original image I[x] 100, having used a method that allows a compression rate close to or greater than 85% depending on the strategy adopted.

Figure 8:
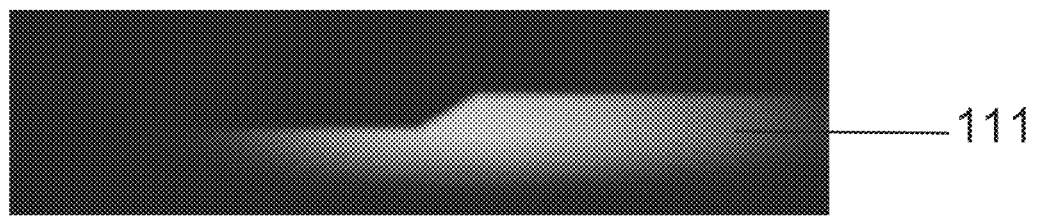
FIG. 8 illustrates a schematic depiction of a photometry relating to an LB, according to the invention.

FIG. 8 illustrates a schematic depiction of a photometry according to an embodiment of the invention relating to a LB 111.

Figure 9:
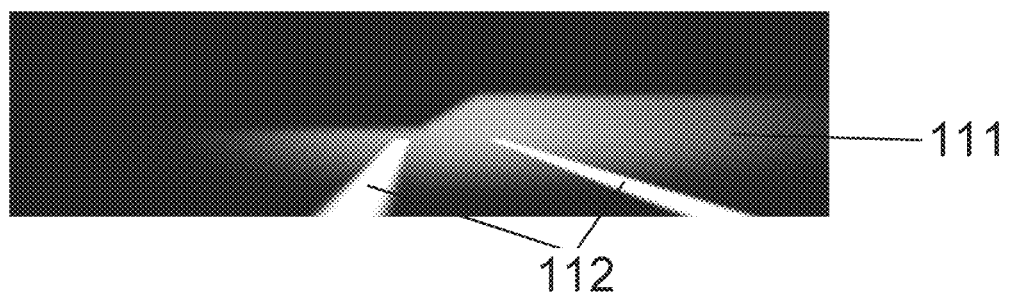
FIG. 9 illustrates a schematic depiction of a photometry relating to an LB with an LA lighting function, according to the invention.

FIG. 9 illustrates a schematic depiction of a photometry according to an embodiment of the invention relating to a LB 111 with an LA 112 lighting function.

Figure 10:
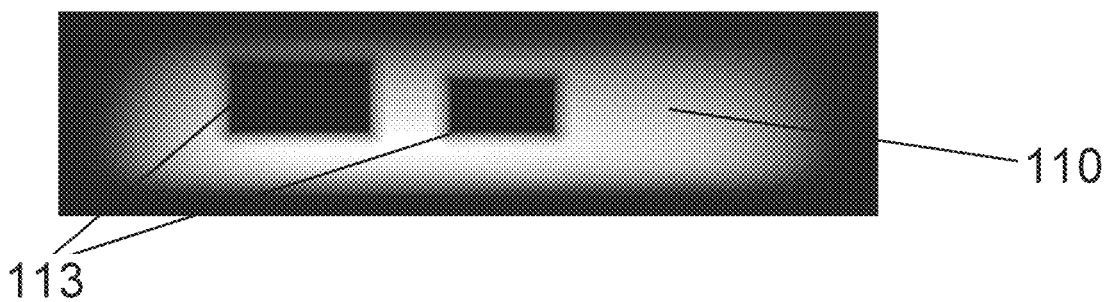
FIG. 10 illustrates a schematic depiction of a photometry relating to an HB with an ADB lighting function, according to the invention.

FIG. 10 illustrates a schematic depiction of a photometry according to an embodiment of the invention relating to a HB 110 with an ADB 113 lighting function.

Figure 11:
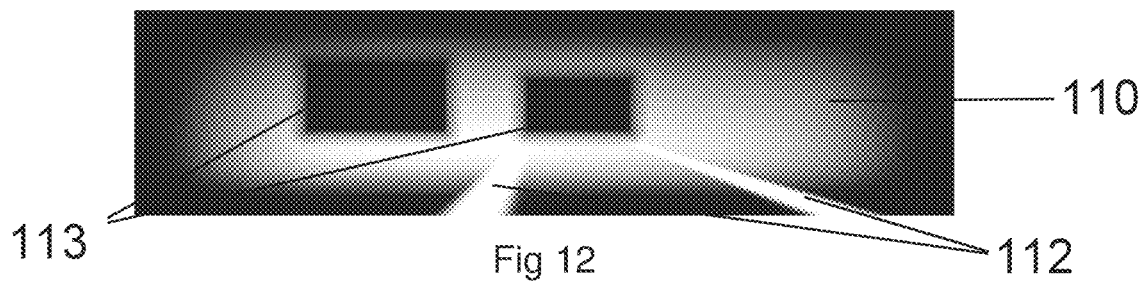
FIG. 11 illustrates a schematic depiction of a photometry relating to an HB with the ADB and LA lighting functions activated, according to the invention.

FIG. 11 illustrates a schematic depiction of a photometry according to an embodiment of the invention relating to a HB 110 with the ADB 113 and LA 112 lighting functions activated.

Figure 12:
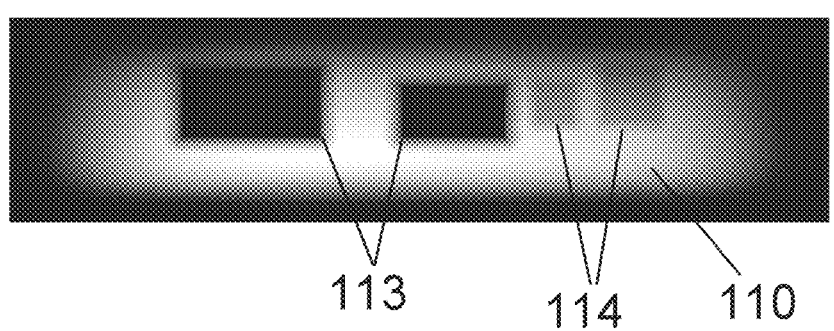
FIG. 12 illustrates a schematic depiction of a photometry relating to an HB with the TSAG and ADB lighting functions activated.

FIG. 12 illustrates a schematic depiction of a photometry according to an embodiment of the invention relating to a HB 110 with the TSAG 114 and ADB 113 lighting functions activated.

FIG. 13 illustrates a schematic depiction of a photometry according to an embodiment of the invention relating to a HB 110 with the TSAG 114, ADB 113 and LA 112 lighting functions activated.

FIG. 14 illustrates a schematic depiction of a photometry according to an embodiment of the invention relating to a HB 110 with the TSAG 114, ADB 113 and LA_Center 115 lighting functions activated.

FIG. 15 illustrates a schematic depiction of a photometry according to an embodiment of the invention relating to HB 110 and DBL 116, with the TSAG 114, ADB 113 and LA 112 lighting functions activated.

What is claimed is:

1. A method for managing image data in a motor vehicle lighting system, the lighting system including at least one lighting module intended to project light beams, the light beams being generated from data relating to the selection of at least one image, each image being respectively defined by a matrix with a plurality of horizontal or vertical rows of pixels, with each pixel being characterized by a numerical value related to a light intensity of the pixel, the method comprising:
   receiving an instruction to activate at least one image intended to be projected;
   calculating, for each pixel in each row in the matrix, a gradient value based on the numerical value of the pixel under analysis and on the numerical value of an adjacent pixel;
   determining, for each pixel in each row in the matrix, whether the pixel under analysis is a significant point of inflection of a curve relating to the row, based on the difference in intensity between the pixel under analysis and a compressed pixels from a list, and based on the spatial difference between the pixel under analysis and the compressed pixel and
   dynamically adapting the value relating to the difference in intensity between the pixel under analysis and the compressed pixel, along with the value relating to the spatial difference between the pixel under analysis and the compressed pixel based on the activation at least one photometry or lighting function;
   storing the pixel under analysis in the list when the pixel under analysis is considered to be a significant point of inflection; and
   transmitting the list to at least one lighting module so that it is able to project a resulting image.

2. The method as claimed in claim 1, wherein the difference in intensity and the spatial difference are respectively constant, configured so as to achieve a desired compression rate, with respect to the activation of at least one photometry or lighting function.

3. The method as claimed in claim 2, characterized in that the difference in intensity is set to 3 or the spatial difference is set to 16/255.

4. The method as claimed in claim 1, wherein the at least one photometry includes a low beam (LB) then the difference in intensity is 3 and the spatial difference
   is 16/255, while the spatial difference is 32/255 when the lighting function includes
      one of the road writing (RW), line assist (LA), line assist center (LA_Center) or the spatial difference is 16/255 when the photometry includes dynamic bending light (DBL).

5. The method as claimed in claim 1, wherein the at least one photometry includes a high beams (HB)
   then the difference in intensity and the spatial difference is 16/255, while the difference in intensity is 5 and the spatial difference is 32/255
   when the lighting functions include adaptive driving beam (ADB), or traffic sign anti-glare (TSAG), or RW, or LA, or LA_Center, and the difference in intensity is 5 and the spatial difference is 64/255 when the lighting functions include
      ADB combined with LA_Center, or
      TSAG combined with LA_Center, or
   ADB combined with TSAG with or without DBL,
   and the difference in intensity is 6 and the spatial difference is 64/255 when the lighting functions include
      ADB combined with TSAG and LA_Center
   or TSAG combined with RW or LA, and the difference in intensity is 6 and the spatial difference is 96/255 when the lighting functions include
   ADB combined with LA are activated, and the difference in intensity is 7 and the spatial difference is 64/255 when the lighting functions includes
   ADB and TSAG combined with RW or LA.

6. The method as claimed in claim 1, wherein the difference in intensity is 3 and the spatial difference is 16/255 when the lighting functions the photometry is OFF, meaning the numerical value of all of the pixels of the original image being at 0 or off, and the at least one lighting functions include RW, or LA, or LA_Center.

7. The method as claimed in claim 1, characterized wherein a compression rate is greater than 85%.

8. A motor vehicle lighting system comprising:
   at least one lighting module including a plurality of light sources able to project at least one photometry or lighting function from a compressed data list,
   a multiplexed bus for transmitting the compressed data list to the at least one lighting module, and
   a control unit (PCM) configured to:
      receive an instruction to activate at least one image intended to be projected, with the at least one image being respectively defined by a matrix with a plurality of horizontal or vertical rows of pixels, with each pixel being characterized by a numerical value related to a light intensity of the pixel;
      calculate, for each pixel in each row in the matrix, a gradient value based on the numerical value of the pixel under analysis and on the numerical value of an adjacent pixel;
      determine, for each pixel in each row in the matrix, whether the pixel under analysis is a significant point of inflection of a curve relating to the row, based on the difference in intensity between the pixel under analysis and a compressed pixels from the compressed data list, and based on the spatial difference between the pixel under analysis and the compressed pixel and dynamically adapting the value relating to the difference in intensity between the pixel under analysis and the compressed pixel, along with the value relating to the spatial difference between the pixel under analysis and the compressed pixel based on the activation at least one photometry or lighting function;
      store the pixel under analysis in the compressed data list when the pixel under analysis is considered to be a significant point of inflection; and transmit the compressed data list to the at least one lighting module so that it is able to project a resulting image.

9. The motor vehicle lighting system as claimed in claim 8, wherein the lighting module further includes a control unit configured to decompress the compressed data list.

10. The motor vehicle lighting system as claimed in claim 9, wherein the control unit includes a memory that stores at least one Welcome and one Goodbye scenario.

11. The motor vehicle lighting system as claimed in claim 8, wherein the plurality of light sources are semiconductor light sources.

12. The motor vehicle lighting system as claimed in claim 9, wherein the control unit includes a memory that stores at least one Welcome or one Goodbye scenario.

* * * * *

UNITED STATES PATENT AND TRADEMARK OFFICE
CERTIFICATE OF CORRECTION

| | | |
|---|---|---|
| PATENT NO. | : 12,067,751 B2 | Page 1 of 1 |
| APPLICATION NO. | : 17/919699 | |
| DATED | : August 20, 2024 | |
| INVENTOR(S) | : Yasser Almehio, Hafid El Idrissi and Constantin Prat | |

It is certified that error appears in the above-identified patent and that said Letters Patent is hereby corrected as shown below:

In the Claims

In Claim 5, Column 12, Line 3, replace, ". . . then the difference in intensity and . . ." with -- . . . then the difference in intensity is 4 and . . . --

In Claim 7, Column 12, Lines 31-32, replace, ". . . claimed in claim 1, characterized wherein . . ." with -- . . . claimed in claim 1, wherein . . . --

Signed and Sealed this
Fifteenth Day of July, 2025

Coke Morgan Stewart
*Acting Director of the United States Patent and Trademark Office*